(12) United States Patent  
Richter et al.

(10) Patent No.: US 8,280,680 B2  
(45) Date of Patent: Oct. 2, 2012

(54) METHOD AND APPARATUS FOR DETECTING MAILPIECE THICKNESS IN AN INSERTER SYSTEM

(75) Inventors: John E. Richter, Trumbull, CT (US); John W. Sussmeier, Cold Spring, NY (US)

(73) Assignee: Pitney Bowes Inc., Stamford, CT (US)

( * ) Notice: Subject to any disclaimer, the term of this patent is extended or adjusted under 35 U.S.C. 154(b) by 368 days.

(21) Appl. No.: 12/632,629

(22) Filed: Dec. 7, 2009

(65) Prior Publication Data

US 2011/0137610 A1 Jun. 9, 2011

(51) Int. Cl.
 *G01B 5/06* (2006.01)
(52) U.S. Cl. ....................................... 702/170
(58) Field of Classification Search .................. 702/170
 See application file for complete search history.

(56) References Cited

U.S. PATENT DOCUMENTS

| | | | |
|---|---|---|---|
| 6,796,434 B2 | 9/2004 | Kako et al. | |
| 6,865,818 B2 | 3/2005 | Petrowich | |
| 2005/0000299 A1* | 1/2005 | Vogel et al. | 73/849 |

* cited by examiner

*Primary Examiner* — Tung S Lau
(74) *Attorney, Agent, or Firm* — Brian A. Collins; Charles R. Malandra, Jr.; Steven J. Shapiro

(57) ABSTRACT

A method of detecting mailpiece thickness includes detecting a leading edge of the mailpiece, moving a detecting roller downwardly over a first predetermined period of time from a first position to a second position where it contacts the mailpiece, increasing a compressive force applied by the detecting roller to the mailpiece from an initial force to a predetermined measurement force over a second predetermined period of time, and applying the measurement force to the mailpiece for a third predetermined period of time. The method further includes applying the measurement force to the mailpiece for a fourth predetermined period of time and making a number of thickness measurements of the mailpiece based on a position of the detecting roller, and determining the thickness of the mailpiece based on the number of thickness measurements.

6 Claims, 4 Drawing Sheets

METHOD AND APPARATUS FOR DETECTING MAILPIECE THICKNESS IN AN INSERTER SYSTEM

BACKGROUND OF THE INVENTION

1. Field of the Invention

The present invention relates to mailpiece inserter systems, and, in particular, to a method and apparatus for detecting the thickness of mailpieces being produced in an inserter system in order to detect and reduce possible mailpiece integrity breaches.

2. Description of the Related Art

Inserter systems are typically used by organizations such as banks, insurance companies, and utility companies for producing a large volume of specific mailings where the contents of each mailpiece are directed to a particular addressee. In many respects, a typical inserter system resembles a manufacturing assembly line. Sheets and other raw materials (e.g., enclosures and envelopes) enter the inserter system as inputs. Then, a plurality of different modules or workstations in the inserter system work cooperatively to process sheets until a finished mailpiece is produced. Typically, inserter systems prepare mailpieces by gathering collations of documents on a conveyer. The collations are then transported on the conveyer to an insertion station where they are automatically stuffed into envelopes. After being stuffed with the collations, the envelopes are removed from the insertion station for further processing, such as automated closing and sealing of the envelopes, weighing of the envelopes, applying postage to the envelopes, and finally sorting and stacking the envelopes.

Mailpiece integrity is a significant concern for users of inserter systems and refers to the correct mailpiece contents being present in an envelope before it enters the mail stream. Many users, particularly in the financial services sector, require and demand extremely high mailpiece integrity levels.

Manufacturers of inserter systems thus make significant efforts to improve hardware and machine control software to reduce the possibility of integrity breaches. One method of reducing the possibility of integrity breaches that has been developed involves measuring the thickness of each mailpiece during production and comparing it to an expected thickness for the mailpiece, wherein the expected thickness is derived in advance from the proper contents for the mailpiece. Mailpieces that fail this integrity check can be diverted from the mail stream for further investigation.

In one conventional system, thickness measurement data is captured from a moving mailpiece during the application of a compressive force on the mailpiece by a detector that is kept in contact with the paper path at all times. This causes two negative effects. First, when an oncoming mailpiece contacts the detector, the impact force drives the detector in a direction that is perpendicular to the paper path direction and causes the detector to oscillate on the mailpiece before an accurate thickness measurement can be taken. Second, mailpieces contain ridges or edges due to the contents, envelope flaps, windows, and/or side seams thereof, and when the detecting roller contacts these thickness variations, similar but smaller oscillations and settling time are introduced before an accurate thickness measurement can be made. Both of these effects increase the required contact zone length for the mailpiece, which represents the minimum length of the mailpiece that must be of substantially constant thickness for an accurate thickness measurement to be made.

SUMMARY OF THE INVENTION

In one embodiment, a method of detecting the thickness of a mailpiece being moved along a flow path is provided that includes detecting a leading edge of the mailpiece, responsive to detecting the leading edge, moving a detecting roller downwardly from a first position above the mailpiece to a second position wherein the detecting roller contacts the mailpiece over a first predetermined period of time, increasing a compressive force applied by the detecting roller to the mailpiece from an initial force to a predetermined measurement force over a second predetermined period of time following the first period of time, applying the measurement force to the mailpiece for a third predetermined period of time following the second predetermined period of time, following the third predetermined period of time, applying the measurement force to the mailpiece for a fourth predetermined period of time and making a number of thickness measurements of the mailpiece based on a position of the detecting roller during the fourth predetermined period of time, and determining the thickness of the mailpiece based on the number of thickness measurements. The method may further include, following the fourth predetermined period of time, moving the detecting roller upwardly to the first position over a fifth predetermined period of time, and holding the detecting roller at the first position over a sixth predetermined period of time before commencing a measurement of a thickness of a second mailpiece.

In another embodiment, an apparatus for detecting the thickness of a mailpiece being moved along a flow path is provided that includes a linear motor having a linear encoder, a detecting roller coupled to the linear motor, a log roller provided below the detecting roller, wherein the mailpiece moves between the detecting roller and the log roller, and a control system operatively coupled to the linear motor. The control system controls the linear motor and movement of the detecting roller, and the control system is programmed to detect a leading edge of the mailpiece, responsive to detecting the leading edge, control the linear motor to move the detecting roller downwardly from a first position above the mailpiece to a second position wherein the detecting roller contacts the mailpiece over a first predetermined period of time, control the linear motor to increase a compressive force applied by the detecting roller to the mailpiece from an initial force to a predetermined measurement force over a second predetermined period of time following the first period of time, control the linear motor to apply the measurement force to the mailpiece for a third predetermined period of time following the second predetermined period of time, following the third predetermined period of time, control the linear motor to apply the measurement force to the mailpiece for a fourth predetermined period of time and make a number of thickness measurements of the mailpiece based on a position of the detecting roller during the fourth predetermined period of time, and determine the thickness of the mailpiece based on the number of thickness measurements. The control system may be further programmed to, following the fourth predetermined period of time, control the linear motor to move the detecting roller upwardly to the first position over a fifth predetermined period of time, and hold the detecting roller at the first position over a sixth predetermined period of time before commencing a measurement of a thickness of a second mailpiece.

Aside from the structural and procedural arrangements set forth above, the invention could include a number of other arrangements, such as those explained hereinafter. It is to be understood that both the foregoing description and the following description are exemplary only.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION OF THE EXEMPLARY EMBODIMENTS

Figure 1:
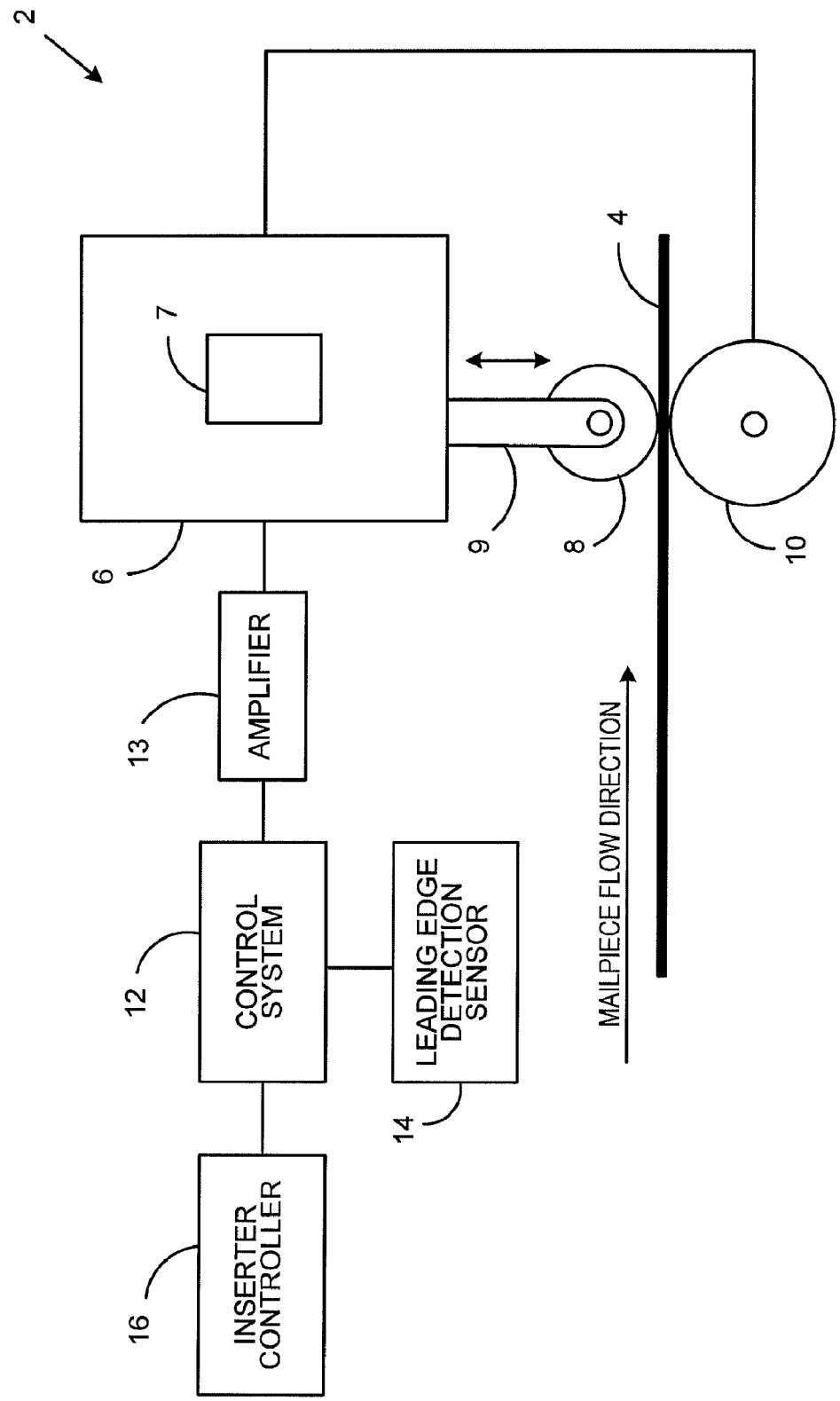
FIG. 1 is a schematic diagram of a thickness detecting module according to one particular embodiment of the invention.

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

As employed, herein, the statement that two or more parts or components are "coupled" together shall mean that the parts are joined or operate together either directly or through one or more intermediate parts or components.

As employed herein, the statement that two or more parts or components "engage" one another shall mean that the parts exert a force against one another either directly or through one or more intermediate parts or components.

As employed herein, the term "number" shall mean one or an integer greater than one (i.e., a plurality).

FIG. 1 is a schematic diagram of a thickness detecting module 2 according to one particular embodiment of the invention. The thickness detecting module 2 may be employed in an inserter system that includes a number of additional modules for producing finished mailpieces as described elsewhere herein. As shown in FIG. 1, mailpieces 4 travel along the flow path of the inserter system and enter the thickness detecting module 2 in the direction shown by the arrow in FIG. 1. The thickness detecting module 2 includes a linear motor 6 that has an integral linear encoder 7 having a particular displacement resolution. In one embodiment, the encoder 7 has a displacement resolution of one micron. Encoders having a different resolution may also be used.

A detecting roller 8 is mounted to the moveable end-effector 9 of the linear motor 6 as shown in FIG. 1. A log roller 10, such as a hardened steel log roller, for example, is provided below the mailpiece flow path and beneath the detecting roller 8. As illustrated in FIG. 1, the mailpieces 4 travel over the log roller 10.

A control system 12 is operatively coupled to and controls the linear motor 6. The control system 12 may include a microprocessor, a microcontroller, or any other suitable processor that is operatively coupled to a suitable memory for storing routines to be executed by the control system 12. Specifically, the memory, which may be separate from and/or internal to the microprocessor, microcontroller, or other suitable processor, stores one or more computer-executable routines for implementing the methods of operation described in greater detail elsewhere herein. In the illustrated embodiment, an amplifier 13 is coupled to the control system 12 and the linear motor 6, as shown in FIG. 1, to amplify the control signal. Other arrangements may also be used.

In addition, a leading edge detection sensor 14, which may be, for example and without limitation, an IR emitter/detector assembly, is positioned over the mailpiece flow path. The leading edge detection sensor 14 is operatively coupled to the control system 12 and is structured to detect the presence of the leading edge of each mailpiece 4 as it moves along the mailpiece flow path. The control system 12 is also operatively coupled to an inserter controller 16, which controls the operation of the inserter system in which the thickness detecting module 2 is provided.

In operation, the linear motor 6 is first calibrated by effectively zeroing its encoder when the detecting roller 8 is commanded by the control system 12 to be in contact with the log roller 10 (without a mailpiece 4 being present). Then, thickness measurements are made on mailpieces 4 as they pass through the thickness detecting module 2 by commanding the linear motor 6 to move, such that the detecting roller 8 contacts the mailpiece 4 after its leading edge has been detected by the leading edge detection sensor 14 and, as described in greater detail herein, after the detecting roller 8 is caused by the linear motor 6 to apply a constant, predetermined force to compress the mailpiece 4 between the detecting roller 8 and the log roller 10. More particularly, thickness measurement data (which is based on the output of the linear encoder) is captured during the application of constant force, as just described, on a predetermined contact zone on the mailpiece 4. The contact zone length is what allows the linear motor/detecting roller to settle to a stable thickness value so that an accurate thickness measurement can be made. For many mailpiece applications, the available distance for the contact zone is limited. It is desirable for the mailpiece in this contact zone to have a substantially constant thickness and contain substantially no ridges or edges due to the contents, envelope flaps, windows, and/or side seams of the mailpiece 4.

For a given mailing application, in order to have the detecting roller 8 contact this contact zone precisely, the assembly, including the linear motor 6 and detecting roller 8, must be adjusted across the mailpiece flow path so that the detecting roller 8 will contact the mailpiece 4 at the correct location relative to the crease line of the mailpiece 4. In addition, two distances in the mailpiece flow direction are determined in advance to define the contact zone. The first distance is from the leading edge of a mailpiece 4 to the position where the detecting roller first contacts the mailpiece 4. The second distance is from the first contact location just described to the location where the thickness measurement procedure is complete and the detecting roller 8 begins to retract back to its upward home position in preparation for the next oncoming mailpiece 4. It is beneficial to set this second distance to be as long as the mailing application physically permits because a longer contact zone provides more measurement data that provides a more accurate computed mailpiece measurement thickness, resulting in higher integrity levels.

For each mailpiece 4 that passes through the thickness detecting module 2, the captured measurement information, which is based upon the displacement of the detecting roller 8, as indicated by the linear encoder, is processed by the control system 12 to determine a value representing the measured thickness of the mailpiece 4, which is uploaded to the inserter controller 16. In one embodiment, a plurality of thickness measurements are made while the detecting roller 8 contacts the mailpiece 4 in the contact zone, and those values are averaged by the control system 12 to obtain the value representing the measured thickness of the mailpiece 4. The inserter controller 16 then evaluates whether the received thickness value is within pre-established boundaries adjacent to an expected thickness value for the mailpiece 4 that is determined in advance of the mail run. If the determined thickness value for a mailpiece 4 is either too thick or too thin (i.e., outside the pre-established boundaries), the mailpiece 4 gets outsorted (i.e., removed) from the mail stream. In one exemplary embodiment, a vertical stacker is provided downstream from the thickness detecting module 2 and mailpieces 4 that fail this thickness test are diverted to that vertical stacker for further investigation.

Figure 2:
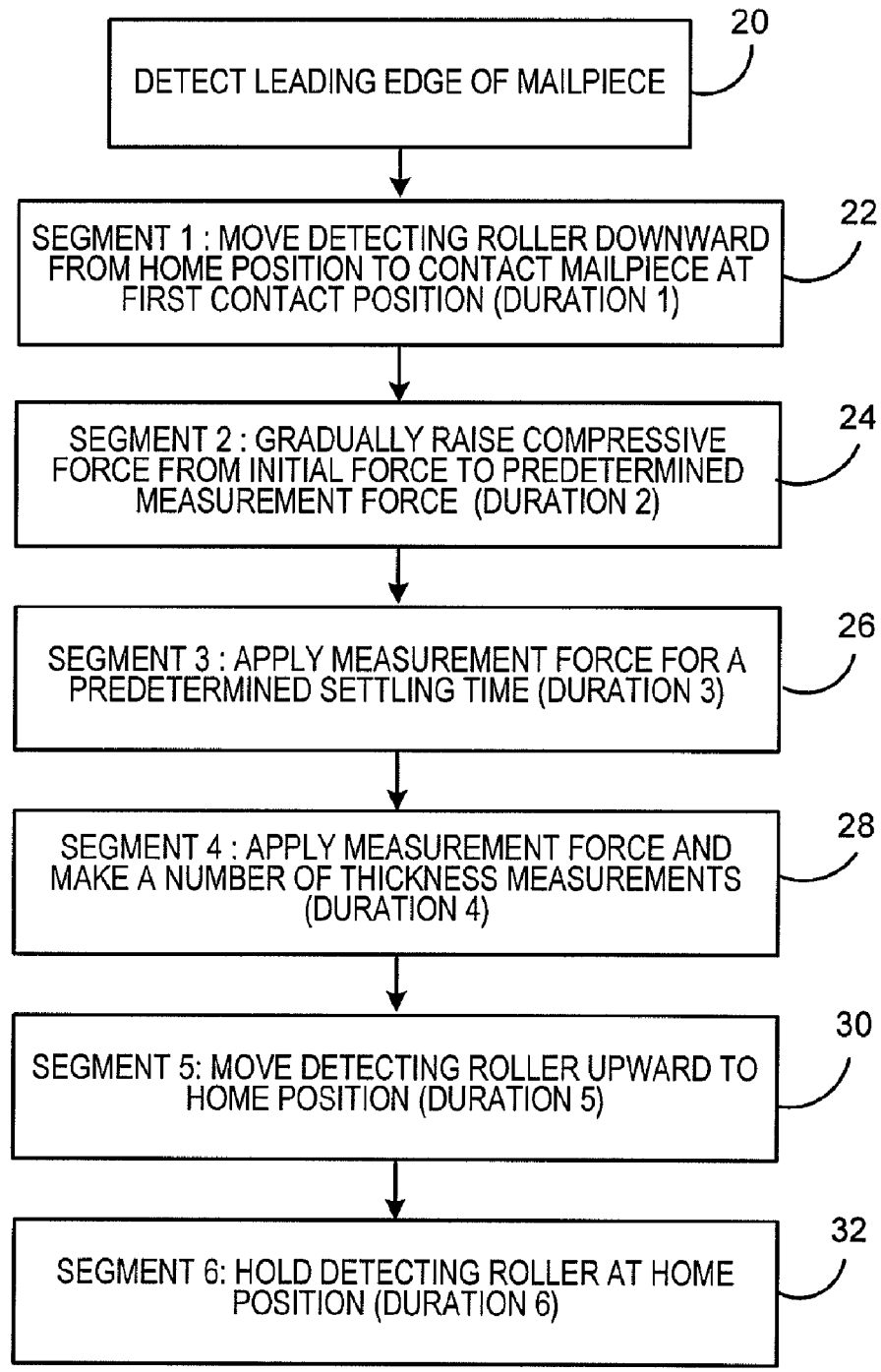
FIG. 2 is a flowchart illustrating a motion control methodology for controlling the thickness detecting module of FIG. 1 according to one particular embodiment.

FIG. 2 is a flowchart illustrating a motion control profile methodology for controlling the thickness detecting module 2 according to one particular embodiment. The motion control profile methodology of this particular embodiment consists of six individual segments which are described in greater detail below. Each of the individual segments has a predetermined duration, which in total make up the cycle time of the motion control profile methodology for a particular mailpiece 4. In one embodiment, the cycle time is computed to allow the processing of up to 26,000 mailpieces per hour. Other cycle times may also be used.

The method begins at step 20, wherein the leading edge of a mailpiece 4 is detected by the leading edge detection sensor 14 and the detection is communicated to the control system 12. Next, in step 22 (segment 1), the detecting roller 8 is moved by the linear motor 6 (under the control of the control system 12) from its home position above the mailpiece 4 to contact the mailpiece 4 at the predetermined first contact position on the mailpiece 4 described elsewhere herein. Segment 1 lasts for a predetermined period of time (duration 1). In one particular embodiment, an SCCA (sine-cosine-constant-acceleration) profile is used for a smooth landing, i.e., having less bounce and settling time. The distance moved by the detecting roller 8 during segment 1 is determined by data from the inserter controller 16, which is based on a known, approximate thickness of the mailpiece 4.

Next, at step 24 (segment 2) the compressive force applied by the detecting roller 8 (under the control of the control system 12) to the mailpiece 4 is gradually raised from an initial force to a predetermined measurement force. In one embodiment, the force is increased linearly from 0 to 14 pounds in approximately 10 milliseconds. Other rates may also be used. Segment 2 lasts for a predetermined period of time (duration 2).

Then, at step 26 (segment 3), the predetermined measurement force is applied to the mailpiece 4 by the detecting roller 8 for a predetermined settling time (duration 3). During segment 3, the detecting roller 8 is allowed to further settle to a steady state position. At step 28 (segment 4), the predetermined measurement force is applied for a predetermined period of time (duration 4) and a number of thickness measurements are made based upon the displacement of the detecting roller 8 (as indicated by the linear encoder of the linear motor 6). The measurement samples taken during segment 4, step 28, are received in the control system 12. In the preferred embodiment, those values are averaged and uploaded to the inserter controller 16 as described elsewhere herein.

At step 30 (segment 5), the detecting roller 8 is moved upwardly (under the control of the control system 12) to the original home position. Segment 5 lasts for a predetermined period of time (duration 5). The retraction of the detecting roller 8 in step 30 gets the detecting roller 8 back out of the mailpiece flow path and ready for the next thickness measurement cycle. Finally, at step 32 (segment 6), the detecting roller 8 is held at the home position for a predetermined period of time (duration 6) that comprises the dwell time at the home position prior to the commencement of the next thickness measurement cycle.

In one particular embodiment of the motion control profile methodology, the six segments have the following particulars. In segment 1, the detecting roller 8 is moved downwardly over a distance of approximately 0.2 inches and lasts for a duration of approximately 35 milliseconds. Segment 2 has a duration equal to approximately 10 milliseconds and lasts from approximately the 35 millisecond mark to approximately the 45 millisecond mark. In addition, in segment 2, the predetermined measurement force is approximately 14 lbs.

Segment 3 in this particular embodiment lasts for a period of approximately 5 milliseconds from approximately the 45 millisecond mark to approximately the 50 millisecond mark. In segment 4, the thickness measurements are made over a period of approximately 5 milliseconds and thus segment 4 lasts from approximately the 50 millisecond mark to approximately the 55 millisecond mark. In addition, in this particular embodiment, a total of ten thickness samples are taken (which are later averaged). In segment 5, the detecting roller 8 is moved upwardly over a distance of approximately 0.2 inches back to the home position. The duration of segment 5 in this particular embodiment is approximately 25.3 milliseconds and thus lasts from approximately the 55 millisecond mark to approximately the 80.3 millisecond mark. Segment 6 in this embodiment lasts for a total of approximately 58.2 milliseconds from approximately the 80.3 millisecond mark to approximately the 138.5 millisecond mark.

Thus, in this particular embodiment, the thickness detection cycle repeats approximately every 138.5 milliseconds. In addition, the mailpiece transmission rate is approximately 100 inches per second and the total time over which the detecting roller 8 contacts the mailpiece 4 is approximately 20 milliseconds covering a distance of approximately two inches. Furthermore, the total measurement time during segment 4 is approximately 5 milliseconds and those measurements are made over a distance of approximately 0.5 inches at approximately 100 inches per second. This particular embodiment, having a cycle time of approximately 138.5 milliseconds, will allow up to 26,000 mailpieces 4 to be processed per hour with only a 2-inch contact zone being required.

Figure 3:
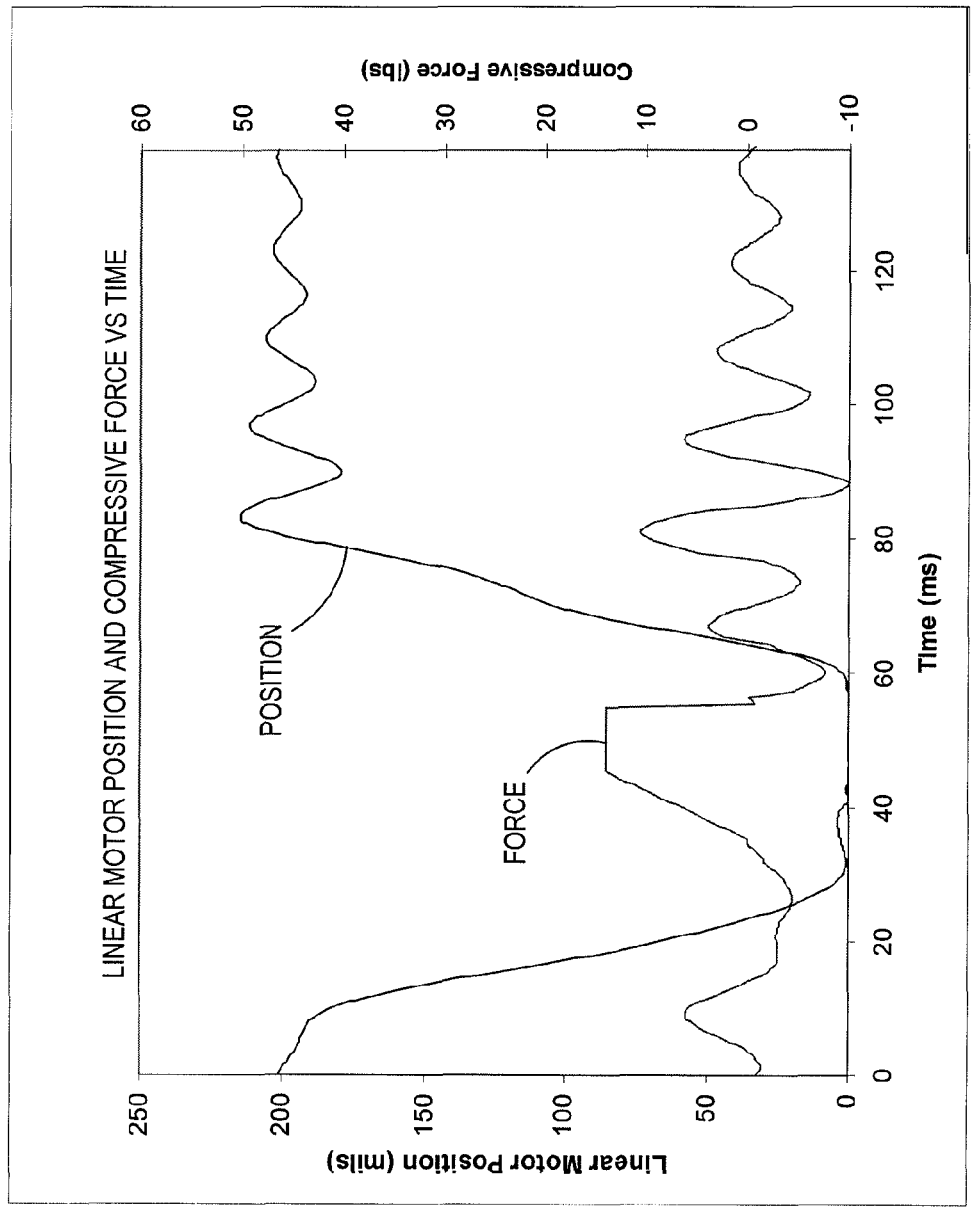
FIG. 3 is a plot showing the position of the linear motor and the applied compressive force over a complete measurement cycle for an embodiment of the thickness detecting module according to the invention.
Figure 4:
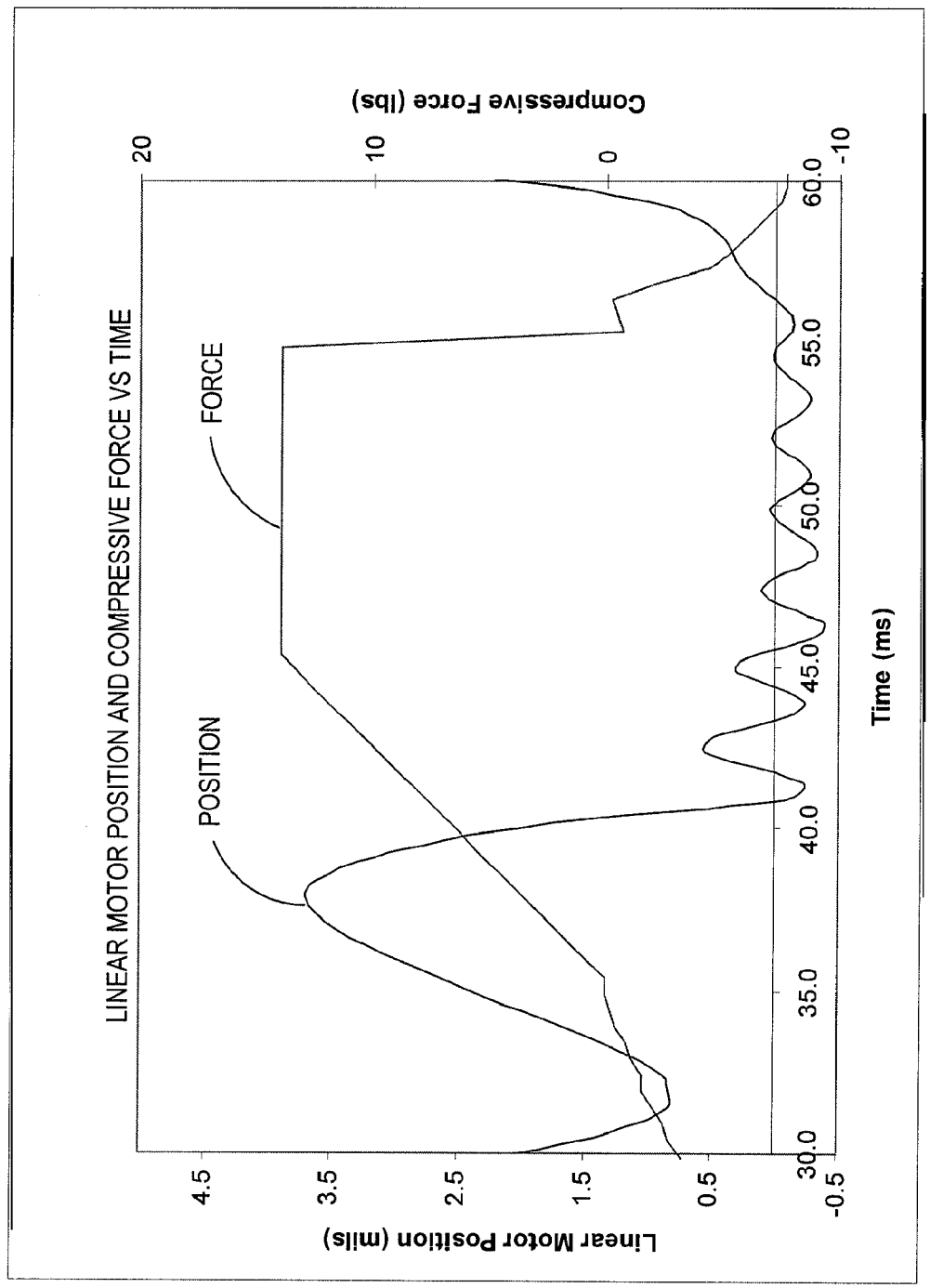
FIG. 4 is a magnification of the plot of FIG. 3 between the 30 millisecond and 60 millisecond time positions.

FIG. 3 is a plot showing the position of the linear motor 6 and the applied compressive force for the complete 138.5 millisecond cycle, where the zero position represents the detecting roller 8 contacting the log roller 10. FIG. 4 is a magnification of the plot of FIG. 3 between the 30 millisecond and 60 millisecond time positions. As FIG. 4 illustrates, segment 2 (35 milliseconds to 45 milliseconds) and segment 3 (45 milliseconds to 50 milliseconds) provide rapid stability and short settling time so that an accurate thickness measurement can be taken during segment 4 (50 milliseconds to 55 milliseconds) if a mailpiece 4 were present in the thickness detecting module 2.

Segment 4 in this particular embodiment typically has a peak-to-peak displacement variation of only about 0.25 mils, where a single sheet of 18# paper is typically 3.8 mils thick. If a mailpiece 4 had been present in the thickness detecting module 2, this oscillation would have occurred around some positive displacement value which is representative of the actual thickness of the mailpiece 4. As noted elsewhere herein, measurement values during segment 4 are preferably averaged to increase accuracy and precision. In FIG. 4, the displacement oscillates slightly below the zero position due to the absence of a mailpiece 4 and also due to the effects of thermal drift.

Another obstacle for achieving accurate thickness measurement values is thermal drift, which is caused by the linear motor 6 heating up or cooling down during operation of the inserter system. Thermal drift in the linear motor 6 will typically introduce a measurement error in the thickness detecting module 2. It has been determined that most of the measurement error due to thermal drift is due to the heating of the linear motor 6 due to $i^2R$ winding losses. The components that affect thermal drift include the detecting roller 8, the clevis that holds the detecting roller 8, the end-effector 9 that extends from the linear motor 6, the linear motor 6 itself, the linear encoder 7 associated with the linear motor 6, the linear motor mount (not shown), the bridge assembly (not shown), the log roller 10, and the bearings (not shown) of the log roller 10. The bridge assembly is the framework that couples the linear motor 6 to the log roller 10 and accommodates linear motor adjustment across the paper path, depending upon the job application, as described elsewhere herein.

The largest temperature rate of change generally occurs at the beginning of a mailpiece production job, when most of the mechanical components of the thickness detecting module 2 are initially at or near ambient temperature. In some embodiments, to minimize the temperature rate of change, all of the components of the thickness detecting module 2 are manufactured from steel, which has a relatively low thermal expansion rate. To further minimize measurement errors associated with thermal changes in the system, according to a further embodiment of the present invention, the thickness detecting module 2 and, in particular, the linear encoder thereof, is periodically automatically re-zeroed under control of the control system 12 during a mailpiece production run. This re-zeroing is accomplished by commanding the linear motor 6 to press the detecting roller 8 against the log roller 10 with a force equal to the predetermined measurement force (e.g., 14 pounds) when no paper present between the detecting roller 8 and the log roller 10. At that point, the linear encoder 7 of the linear motor 6 is re-zeroed and thereafter production may resume. In one particular embodiment wherein the maximum processing rate is 26,000 mailpieces per hour, the encoder is re-zeroed in this manner every 1,000 mailpieces, which equates to once every 138 seconds.

It will be apparent to those skilled in the art that various modifications and variations can be made to the structure and methodology described herein. Thus, it should be understood that the invention is not limited to the examples discussed in the specification. Rather, the present invention is intended to cover modifications and variations.

What is claimed is:

1. A method of detecting a thickness of a mailpiece being moved along a flow path, comprising:

detecting a leading edge of the mailpiece using a detection sensor to communicate a detection signal to a control system of a thickness detecting module;

moving a detecting roller of the thickness detecting module downwardly, in response to the detection signal, the detecting roller being controlled by the control system to move over a first predetermined period of time from a first position above the mailpiece to a second position using an SCCA profile to contact the mailpiece;

applying a compressive force by the detecting roller to the mailpiece, the compressive force of the detecting roller being controlled by the control system to increase from an initial force to a predetermined measurement force over a second predetermined period of time following the first predetermined period of time;

applying the measurement force, of the detecting roller by the control system, to the mailpiece for a third predetermined period of time following the second predetermined period of time;

following the third predetermined period of time, applying the measurement force, by the control system, to the mailpiece, by the detecting roller, for a fourth predetermined period of time and making a number of thickness measurements of the mailpiece based on a position of the detecting roller during the fourth predetermined period of time; and determining, by the control system, the thickness of the mailpiece based on the number of thickness measurements.

2. The method according to claim 1, further comprising, following the fourth predetermined period of time, moving the detecting roller upwardly to the first position over a fifth predetermined period of time, and holding the detecting roller at the first position over a sixth predetermined period of time before commencing a measurement of a thickness of a second mailpiece.

3. The method according to claim 2, wherein in the second position the detecting roller contacts the mailpiece at a first predetermined location on the mailpiece, and wherein the detecting roller is moved upwardly to the first position from a second predetermined location on the mailpiece.

4. The method according to claim 1, wherein the predetermined measurement force is approximately 14 lbs.

5. The method according to claim 1, wherein making a number of thickness measurements of the mailpiece comprises making a plurality of thickness measurements of the mailpiece, and wherein determining the thickness of the mailpiece comprises computing an average of the plurality of thickness measurements.

6. The method according to claim 1, wherein the detecting roller is coupled to a linear motor having a linear encoder, wherein making a number of thickness measurements of the mailpiece based on a position of the detecting roller during the fourth predetermined period of time comprises making the number of thickness measurements based on a number of outputs of the linear encoder, and wherein the method further comprises periodically re-zeroing the encoder during processing of a plurality of mailpieces.

* * * * *